United States Patent [19]

Duran

[11] 3,980,327

[45] Sept. 14, 1976

[54] LATCHING MECHANISM

[75] Inventor: John A. Duran, Glendora, Calif.

[73] Assignee: Avibank Mfg. Inc., Burbank, Calif.

[22] Filed: Apr. 29, 1974

[21] Appl. No.: 464,754

[52] U.S. Cl. .................................. 292/252; 85/5 B; 24/211 N

[51] Int. Cl.[2] .................... E05B 65/19; E05B 65/28; E05C 1/14; F16B 19/00

[58] Field of Search ................. 292/252, 23; 85/5 B; 24/211 N; 70/34, 386

[56] References Cited

UNITED STATES PATENTS

| | | | |
|---|---|---|---|
| 2,786,383 | 3/1957 | Bachman | 24/211 N |
| 3,233,496 | 2/1966 | DePew et al. | 85/5 B |
| 3,631,377 | 12/1971 | Ball et al. | 85/5 B |

FOREIGN PATENTS OR APPLICATIONS

| | | | |
|---|---|---|---|
| 679,433 | 2/1964 | Canada | 24/211 N |

*Primary Examiner*—Paul R. Gilliam
*Assistant Examiner*—Carl F. Pietruszka
*Attorney, Agent, or Firm*—Poms, Smith, Lande & Glenny

[57] ABSTRACT

A latching mechanism having a latch member and a pin assembly mounted on the latch member. The pin assembly includes a first sleeve member secured at one end to the latch member, a second sleeve member secured to the other end of the first sleeve member and having an opening therein and a third sleeve member slidably mounted on the second sleeve member and normally biased in a direction encircling the opening in the second sleeve member. A pin is slidably mounted within the first sleeve member and extends into the second sleeve member and detent means are associated with both the pin and the second sleeve member for selectively preventing the third sleeve member from moving into a position encircling the opening and for releasing the third sleeve member for movement to a position encircling the opening. A locking flange having a floating ring therein is provided for receiving the pin assembly in locking engagement therewith.

4 Claims, 5 Drawing Figures

LATCHING MECHANISM

BACKGROUND OF THE INVENTION

1. Field of the Invention

The invention relates to latching mechanisms; and, more particularly, to a latch assembly which can be quickly automatically locked and easily released.

2. Description of the Prior Art

Many types of latching mechanisms exist in the prior art. One class of these mechanisms are those which provide a positive lock while capable of being quickly and easily released. Generally, such quick-release latching mechanisms are relatively complex and expensive. Thus, there exists a need for a latching mechanism which can be inexpensively manufactured while providing a positive latch that can be quickly and easily released. Further, it is desirable that such latch mechanisms be capable of being automatically locked when moved into latching position.

SUMMARY OF THE INVENTION

It is an object of this invention to provide an improved latch assembly which can be easily automatically latched when moved or rotated into latching position.

It is another object of this invention to provide an improved latch assembly which can be quickly released from its latching position.

These and other objects are preferably accomplished by providing a latching mechanism having a latch member and a pin assembly mounted on the latch member. The pin assembly includes a first sleeve member secured at one end to the latch member, a second sleeve member secured to the other end of the first sleeve member and having an opening therein and a third sleeve member slidably mounted on the second sleeve member normally biased in a direction encircling the opening in the second sleeve member. A pin is slidably mounted within the first sleeve member and extends into the second sleeve member and detent means are associated with both the pin and the second sleeve member for selectively preventing the third sleeve member from moving into a position encircling the opening and for releasing the third sleeve member for movement to a position encircling the opening. A locking flange having a floating ring therein is provided for receiving the pin assembly in locking engagement therewith.

DESCRIPTION OF THE PREFERRED EMBODIMENT

Figure 1:
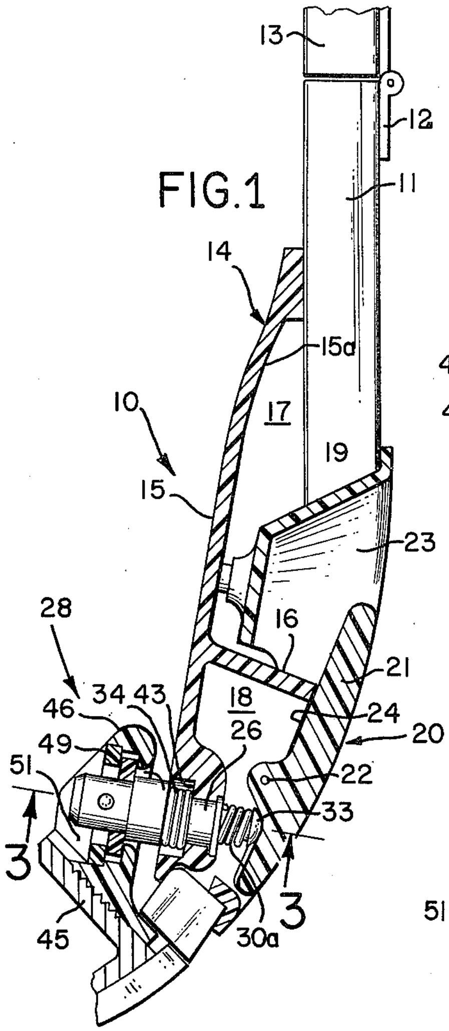
FIG. 1 is a vertical sectional view of a latch assembly in accordance with the invention.

Referring now to FIG. 1 of the drawing, a latch assembly 10 is shown having a latch member 11 which may be hingedly connected, via hinge 12, to one end of a support member 13.

A housing 14 is fixedly secured to latch member 11 and includes a bottom wall 15 and a divider wall 16 dividing housing 14 into compartments 17 and 18. A generally dish-shaped member 19 is secured to both latch member 11 and housing 14.

As particularly contemplated within the present invention, latching means are provided for quickly locking and releasing latch member 11. In the exemplary embodiment, such latching means, indicated generally at 20, includes a release handle 21 in the form of a plate or the like pivotally mounted by pivot pins 22 to latch member 11 (the top or upper surface of handle 21 being generally flush with the upper surface of latch member 11). In this manner, a space 23 is formed between handle 21 and the bottom of member 19 and also beneath the bottom or lower surface 24 of handle 21. It can be seen that handle 21 pivots about pins 22 with the edge of divider wall 16 acting as a stop therefor.

Figure 5:
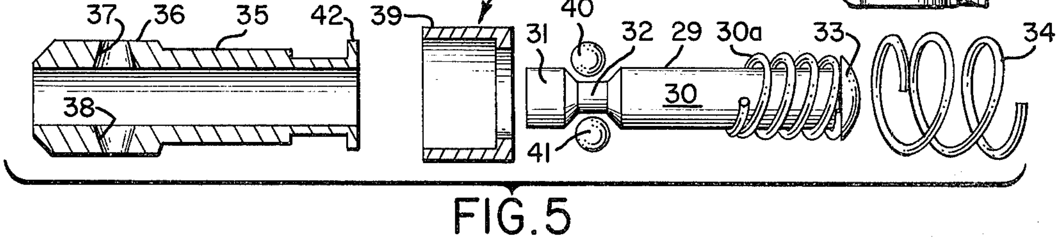
FIG. 5 is an exploded view of the latch pin assembly of the latch member of FIGS. 1 through 4.

Latching means 20 further includes an aperture 26 formed in the bottom wall 15 of housing 14 for receiving therethrough a latch pin assembly 28. Pin assembly 28 is shown in exploded view in FIG. 5 and in assembled view in FIG. 1. Thus, referring to both FIGS. 1 and 5, pin assembly 28 includes a centrally located sliding elongated pin 29 generally circular in cross-section and having a main body portion 30 separated from a head portion 31 by a reduced neck portion 32. The cross-section of main body portion 30 and head portion 31 are of generally the same diameter. The rear end of main body portion 30 terminates in a rounded enlarged portion 33 for reasons to be discussed further hereinbelow. It can be seen that head portion 31 tapers into neck portion 32 for reasons also to be discussed further hereinbelow. A spring 30*a* encircles main body portion 30 and abuts against enlarged portion 33 as shown.

Pin assembly 28 further includes a helical spring 34 and a generally tubular sleeve member 35 for receiving pin 29 therein. Sleeve member 35 has a flanged end 42 which is created after assembly as discussed hereinbelow and includes a generally tubular integral head portion 36. A pair of openings or apertures 37, 38 which may be generally conically shaped, are provided on opposite sides of head portion 36. A generally tubular sleeve member 39 is adapted to slidably fit over the outer surface of sleeve member 36 and is trapped thereon. Sleeve member 39 bottoms out against the shoulder of sleeve member 36. Finally, pin assembly 28 includes detent means in the preferred form of a pair of balls 40, 41 or the like having a diameter slightly greater than the smallest diameter of apertures 37, 38 for reasons to be discussed further hereinbelow.

In assembling pin assembly 28, pin 29 may be inserted into sleeve members 35 and balls 40, 41 inserted into the head portion 36 thereof through apertures 37, 38 (if apertures 37, 38 are generally round, the walls of apertures 37, 38 may be peened or staked as is well known in the art for preventing balls 40, 41 from falling thereout). Sleeve member 39 may be slidably mounted over sleeve member 36 with spring 34 encircling sleeve member 35 and abutting against sleeve member 39 when assembled. Flanged end 42 is formed after member 35 is placed into wall 15 of housing 14 as discussed hereinbelow.

Figure 3:
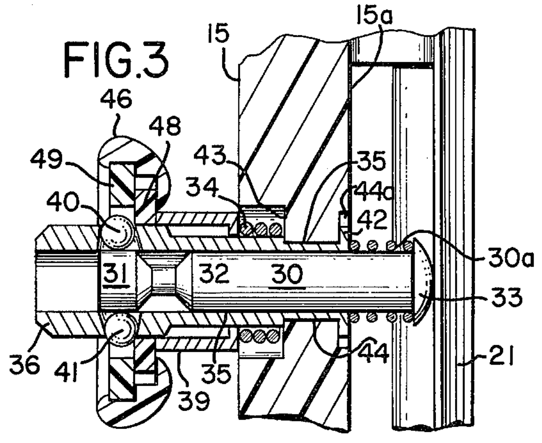
FIG. 3 is a view taken along lines 3—3 of FIG. 1 of a portion of the latch assembly of FIG. 1 with the latch member in locked position.

The completed assembly of latch pin assembly 28 in operative position in the latch assembly 10 is shown in FIGS. 1 & 3. Referring once again to FIG. 1 and also to FIG. 3, it can be seen that spring 34 is retained in position by abutment with both the rear end of sleeve member 39 and a cavity or depression 43 formed in bottom wall 15 of housing 14. The sleeve member 35 is slipped into a suitable aperture 44 formed in bottom wall 15 until it bottoms against depression 43 with flanged end 42 being then formed in a cavity 44*a* in any suitable manner, such as by flaring or the like, formed in the inner wall 15*a* of housing 14. This creates a mechanical lock. Spring 30*a* thus abuts against flanged end 42 and enlarged head portion 33 as shown. In this manner, the underside or lower surface 24 of handle 21 is adapted to abut against the rounded portion 33 of pin 29 when handle 21 is pivoted as will be discussed further hereinbelow.

Figure 2:
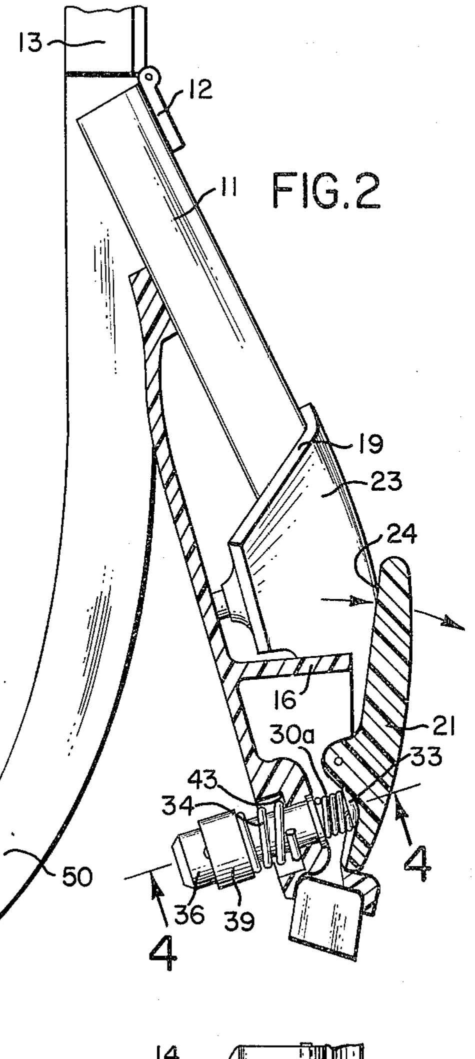
FIG. 2 is a view similar to FIG. 1 of the latch assembly of FIG. 1 showing the latch member thereof in an unlocked position.
Figure 4:
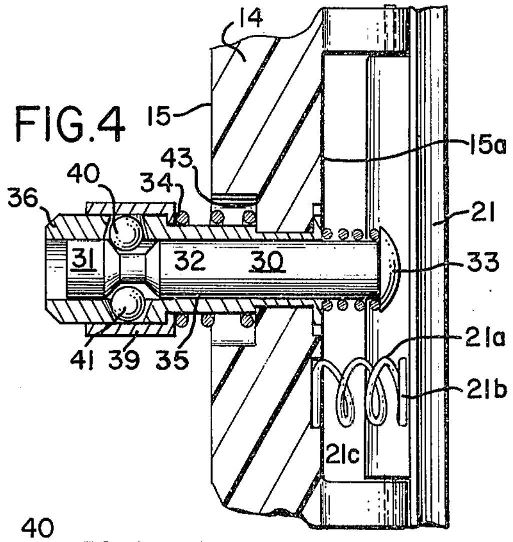
FIG. 4 is a view taken along lines 4—4 of FIG. 2 showing the latch member in unlocked position.

The normal position of pin assembly 28 and handle 21 prior to locking of the pin assembly 28 into aperture 47 is shown in FIG. 2. Spring 34 is retained by cavity 43 and sleeve member 39. Sleeve member 39 is retained in position by bottoming out against the step created by the intersection of sleeve members 35 & 36. Since head portion 31 of pin 29 engages balls 40, 41, the balls 40, 41 are pushed in a direction out of openings or apertures 37, 38 but are retained within pin assembly 28 by the walls forming apertures 37, 38 as discussed hereinabove. As handle 21 is moved or pivoted about pins 22, the underside or lower surface 24 of handle 21 abuts against the rounded portion 33 of pin 29 and pin 29 is moved toward the left in FIG. 3 until balls 40, 41 enter the reduced area formed by the reduced neck portion 32 as shown in FIG. 4. This permits sleeve member 39 to slide forwardly or to the left in FIG. 3 to a position bypassing balls 40, 41 as shown in FIG. 4. A spring 21*a*, one end of which surrounds a boss 21*b* on the lower surface 24 of handle 21 and the other end of which is disposed in a cavity 21*c* formed in inner wall 15*a* may be provided to assist in returning handle 21 to its prelatching position.

Figure 6:
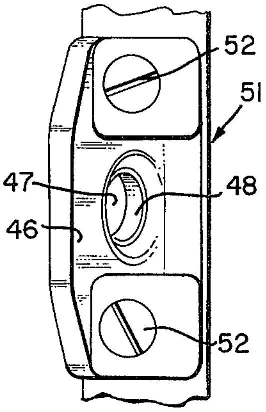
FIG. 6 is a perspective view of the locking flange alone of the latch assembly of FIG. 1.

Referring back to FIG. 1, as particularly contemplated in the present invention, locking means are provided for locking pin assembly 28 in a suitable locking member. In the exemplary embodiment, such means, indicated generally at 51, includes an upstanding support flange 45 having a locking member 46 threaded thereto and secured by screws 52 (see FIG. 6). Flange 45 may be integral with support member 13 by means of support member 50 as shown (or may be separate therefrom but in position to be engaged by pin assembly 28).

An aperture 47 extends through locking member 46 and has a longitudinal axis generally aligned with the longitudinal axis of pin assembly 28.

As particularly contemplated within the present invention, means may be provided for allowing for slight misalignment of pin assembly 28 with aperture 47. In the exemplary embodiment, such means comprises a floating ring 48 disposed in aperture 47 and retained therein by a retaining ring 49 (see FIG. 1). It can be seen therefore, that floating ring 48 allows for slight misalignment of pin assembly 28 with locking member 46.

The inner diameter of the opening in ring 48 is slightly greater than the outer diameter of head portion 36 for receiving the head portion 36 therein. As latch member 14 is moved from the unlocked FIGS. 2 and 4 position to the locked position shown in FIG. 1, head portion 36 enters the opening in ring 48. The outer diameter of sleeve member 39 is greater than the inner diameter of the opening in ring 48 as seen in FIG. 3 so that sleeve member 39 abuts against the ring 48 which pushes sleeve member 39 against spring 34 to the FIG. 3 locking position. The final automatic locking position of pin assembly 28 in ring 48 is shown in FIGS. 1 and 3. It can be seen that balls 40, 41 are disposed on one side of ring 48 and sleeve member 39 on the other side thereof thus positively locking the pin assembly 28 within ring 48. In other words, sleeve member 39 moves against spring 34 a distance sufficient to have balls 40, 41 first clear the opening in ring 48 (with pin 30 in the FIG. 4 position), then lock on the other side of the opening in ring 48 (with pin 30 now in the FIG. 3 position).

Thus, as latch member 11 is pivoted or moved about hinge 12 into engagement of pin assembly 28 with locking flange 46, the latch member 11 automatically locks into engagement with flange 46. The rounded portion 33 of pin 29 is now abutting against the lower surface 24 of handle 21.

In order to quickly and easily release the pin assembly 28 from locking in the opening of ring 48, handle 21 is lifted or pivoted about pins 22 as shown in FIG. 1 to thereby move pin 30 from the FIG. 3 to the FIG. 4 position permitting balls 40, 41 to enter the reduced area formed by the reduced neck portion 32 of pin 29. Balls 40, 41 thus clear the opening in ring 48 permitting the pin assembly 28 to be unlocked therefrom.

Any suitable materials may be used to manufacture the various components of my latch assembly 10. In addition to floating ring 48, slight misalignment of the locking operation may also be provided for by making the various members and apertures slightly greater or larger than required.

Although a particular type of latch assembly 10 has been described, it is to be understood that the novel features of my latch assembly 10, as set forth in the appended claims, may be applicable to any environment where an automatic locking latch handle mechanism is desirable. Such mechanisms are particularly useful on aircraft and the various portions of my mechanism may be comprised of related components of an aircraft or the like and is only intended to be limited by the appended claims.

I claim as my invention:

1. In a latching mechanism having a latch member, latching means operatively connected to said latch member for latching said latch member in a locked position, the improvement which comprises:

said latching means including a pin assembly slidably mounted within said latch member and having a first elongated hollow sleeve member having a generally cylindrical wall fixedly secured at one end to said latch member, and said first sleeve member having adjacent the distal end thereof at least one opening extending through said wall opening into the interior thereof, a second elongated hollow sleeve member having an overall length substantially less than said wall slidably mounted on said first sleeve member and surrounding the cylindrical wall thereof and movable from a first position on said first sleeve member surrounding said opening to a second position unblocking said opening in said cylindrical wall, an elongated generally cylindrical pin slidably and axially mounted within the interior of said first sleeve member, resilient means encircling said cylindrical wall between said second sleeve member and said latch member abutting against said latch member and biasing said second sleeve member to its first position, and detent means including said pin having a first portion of a generally uniform diameter and a second portion of a generally uniform diameter, said first portion being connected to said second portion by a third portion having a reduced diameter with respect to said first and second portions, and at least one detent member loosely disposed within both said opening and said third portion and abutting against the inner wall of said second sleeve member when said second sleeve member is in said first position and loosely disposed within said opening and abutting against the outer periphery of said first portion and extending beyond the outer periphery of said first sleeve member when said second sleeve member is in said second position in blocking relationship to said second sleeve member, said opening being adapted to allow only a portion of said detent member to extend outwardly thereof, and stop means associated with both said first and second sleeve members for preventing axial movement of said second sleeve member past said opening in a direction away from said latch member;

said latch member being hingedly mounted by a hinge fixedly secured to a housing; and locking means in operative relationship with said latching means for receiving said latching means in its locked position, said locking means including a locking aperture disposed in a flange member extending from said housing, said aperture having its central axis generally aligned with respect to the central longitudinal axis of said pin and adapted to be slidably engaged by said distal end of said first sleeve member upon movement of said latch member about its hinge to its locked position into engagement with said aperture.

2. In a latching mechanism having a latch member, latching means operatively connected to said latch member for latching said latch member in a locked position, the improvement which comprises:

said latching means including a pin assembly slidably mounted within said latch member and having a first elongated hollow sleeve member having a generally cylindrical wall fixedly mounted at one end to said latch member, and said first sleeve member having adjacent the distal end thereof at least one opening extending through said wall opening into the interior thereof, a second elongaged hollow sleeve member having an overall length substantially less than said wall slidably mounted on and surrounding the cylindrical wall of said first sleeve member and movable from a first position on said first sleeve member surrounding said opening to a second position unblocking said opening in said cylindrical wall, an elongated generally cylindrical pin slidably and axially mounted within the interior of said first sleeve member, resilient means encircling said cylindrical wall between said second sleeve member and said latch member abutting against said latch member and biasing said second sleeve member to its first position, and detent means including said pin having a first portion of a generally uniform diameter and a second portion of a generally uniform diameter, said first portion being connected to said second portion by a third portion having a reduced diameter with respect to said first and second portions, and at least one detent member loosely disposed within both said opening and said third portion and abutting against the inner wall of said second sleeve member when said second sleeve member is in said first position and loosely disposed within said opening and abutting against the outer periphery of said first portion and extending beyond the outer periphery of said first sleeve member when said second sleeve member is in said second position in blocking relationship to said second sleeve member, said opening being adapted to allow only a portion of said detent member to extend outwardly thereof and stop means associated with both said first and second sleeve members for preventing axial movement of said second sleeve member past said opening in a direction away from said latch member; and locking means in operative relationship with said latching means for receiving said latching means in its locked position, said locking means including a locking aperture having its central axis generally aligned with respect to the central longitudinal axis of said pin and adapted to be slidably engaged by said distal end of said first sleeve member upon movement of said latch member to its locked position, said locking aperture including misalignment means associated therewith for providing for slight misalignment of said central longitudinal axis of said pin with the central axis of said locking aperture when the distal end of said first sleeve member is moved to its position in engagement with said locking means.

3. In the latching mechanism of claim 2 wherein said misalignment means includes a floating ring disposed in the locking aperture and movable therein, said ring having an aperture with a central axis generally aligned with the central longitudinal axis of said pin.

4. In the latching mechanism of claim 2 wherein said misalignment means further includes retaining means associated with said ring for movably retaining said ring in said locking aperture.

* * * * *